(12) United States Patent
Chen et al.

(10) Patent No.: US 11,579,474 B2
(45) Date of Patent: Feb. 14, 2023

(54) POLARIZATION IMAGING APPARATUS, POLARIZATION IMAGING METHOD, CONTROLLER AND STORAGE MEDIUM

(71) Applicants: BOE Technology Group Co., Ltd., Beijing (CN); University of Electronic Science and Technology of China, Sichuan (CN)

(72) Inventors: Xiaoxi Chen, Beijing (CN); Junrui Zhang, Beijing (CN); Mao Ye, Beijing (CN); Xuehui Zhu, Beijing (CN); Zhidong Wang, Beijing (CN); Pengwei Li, Beijing (CN); Lijia Zhou, Beijing (CN)

(73) Assignees: BOE Technology Group Co., Ltd., Beijing (CN); University of Electronic Science and Technology of China, Sichuan (CN)

( * ) Notice: Subject to any disclaimer, the term of this patent is extended or adjusted under 35 U.S.C. 154(b) by 245 days.

(21) Appl. No.: 17/255,438

(22) PCT Filed: May 26, 2020

(86) PCT No.: PCT/CN2020/092387
§ 371 (c)(1),
(2) Date: Dec. 23, 2020

(87) PCT Pub. No.: WO2020/244423
PCT Pub. Date: Dec. 10, 2020

(65) Prior Publication Data
US 2021/0263347 A1    Aug. 26, 2021

(30) Foreign Application Priority Data
Jun. 6, 2019    (CN) .......................... 201910491631.0

(51) Int. Cl.
*G02F 1/133*    (2006.01)
*G02F 1/01*    (2006.01)
(Continued)

(52) U.S. Cl.
CPC .......... *G02F 1/0136* (2013.01); *G02F 1/1396* (2013.01); *G02F 1/13306* (2013.01); *G02F 1/29* (2013.01); *H04N 5/23212* (2013.01)

(58) Field of Classification Search
None
See application file for complete search history.

(56) References Cited

U.S. PATENT DOCUMENTS 8,100,539 B2    1/2012  Tseng et al.
2013/0083386 A1    4/2013  Harding et al.
(Continued)

FOREIGN PATENT DOCUMENTS

CN    102095502 A    6/2011
CN    103033942 A    4/2013
(Continued)

OTHER PUBLICATIONS

International Search Report for PCT/CN2020/092387 dated Aug. 12, 2020.
(Continued)

*Primary Examiner* — Twyler L Haskins
*Assistant Examiner* — Fayez A Bhuiyan
(74) *Attorney, Agent, or Firm* — Ling Wu; Stephen Yang; Ling and Yang Intellectual Property

(57) ABSTRACT

Provided are a polarization imaging apparatus, a polarization imaging method, a controller and a computer readable storage medium. The polarization imaging apparatus includes an optical rotation device, a lens device, an image sensor, an image processor, and a controller which are sequentially arranged along a ray direction of incident light.
(Continued)

The controller is configured to control the optical rotation device to be in a first optical rotation state or a second optical rotation state, control the lens device to be in an in-focus state or an out-of-focus state, and control the image sensor to collect light passing through the optical rotation device and the lens device to obtain multiple images. The image processor is configured to obtain polarized image information according to the multiple images.

16 Claims, 3 Drawing Sheets

(51) Int. Cl.
  G02F 1/139 (2006.01)
  G02F 1/29 (2006.01)
  H04N 5/232 (2006.01)

(56) References Cited

U.S. PATENT DOCUMENTS

| | | |
|---|---|---|
| 2015/0189173 A1 | 7/2015 | Ye et al. |
| 2015/0381877 A1 | 12/2015 | Ye et al. |
| 2016/0037024 A1 | 2/2016 | Cui et al. |
| 2016/0327779 A1* | 11/2016 | Hillman ............... G02B 23/04 |
| 2020/0185436 A1* | 6/2020 | Mitani ............... H04N 5/23238 |

FOREIGN PATENT DOCUMENTS

| | | |
|---|---|---|
| CN | 103728808 A | 4/2014 |
| CN | 105301864 A | 2/2016 |
| CN | 105446049 A | 3/2016 |
| CN | 105467714 A | 4/2016 |
| CN | 105573007 A | 5/2016 |
| CN | 110221456 A | 9/2019 |
| JP | 2009-130805 A | 6/2009 |
| WO | 2012027906 A1 | 3/2012 |

OTHER PUBLICATIONS

Office Action dated Feb. 3, 2021 for Chinese Patent Application No. 201910491631.0 and English Translation.

Rui Bao et al., "Polarizer-free imaging of liquid crystal lens", Optics Express, Aug. 11, 2014, pp. 19824-19830, vol. 22, No. 16.

Hui Li et al., "Three-dimensional imaging based on electronically adaptive liquid crystal lens", Applied Optics, Nov. 20, 2014, pp. 7916-7923, vol. 53, No. 33, Optical Society of America.

* cited by examiner

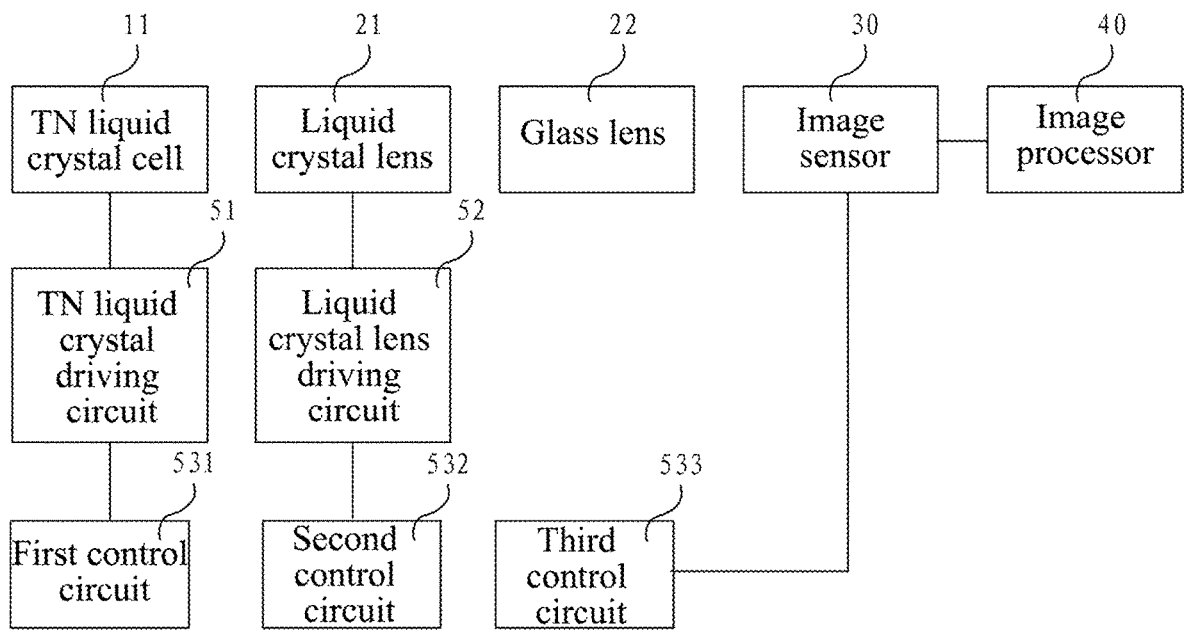

FIG. 3

Control the optical rotation device to be in a first or second optical rotation state, control the lens device to be in an in-focus or out-of-focus state, and control the image sensor to collect light passing through the optical rotation device and the lens device to obtain multiple images — Act S1

Obtain polarized image information according to the multiple images — Act S2

FIG. 4

POLARIZATION IMAGING APPARATUS, POLARIZATION IMAGING METHOD, CONTROLLER AND STORAGE MEDIUM

CROSS-REFERENCE TO RELATED APPLICATIONS

The present application is a U.S. National Phase Entry of International Application No. PCT/CN2020/092387 having an international filing date of May 26, 2020, which claims the priority of the Patent Application No. 201910491631.0, filed to the CNIPA on Jun. 6, 2019 and entitled "Polarization Imaging Apparatus and Method thereof". The above-identified applications are incorporated into the present application by reference in their entirety.

TECHNICAL FIELD

Embodiments of the present disclosure relate to, but are not limited to, the technical field of imaging, in particular to a polarization imaging apparatus, a polarization imaging method, a controller and a computer readable storage medium.

BACKGROUND

Polarization imaging technology is widely applied in Earth remote sensing, astronomical observation, target recognition, medical diagnosis and 3D reconstruction, etc. Natural light does not show polarization characteristics, and it is evenly distributed in all directions with the same amplitude. However, for partially polarized light, amplitudes of light waves in different polarization directions are unequal, and the amplitudes in two perpendicular directions have maximum and minimum values. Therefore, polarization degree can be used to distinguish some substances, for example, polarization degree of natural substance is different from that of camouflage substance. The principle of polarization imaging is that, when the natural light (unpolarized light) interacts with substance, such as reflection, refraction, scattering and absorption, its emergent light often becomes partially polarized light or linearly polarized light. According to Kirchhoff s laws and Fresnel formula, the polarization degree of emergent light has a direct relationship with intrinsic properties of substance interface and a reflection angle (or refraction angle). The intrinsic properties of substance interface include composition, structure, roughness, water content, etc. By obtaining and analyzing the polarized image of the target, it is easier to identify the target and reconstruct a three-dimensional shape of the target object by calculating the reflection angle (or refraction angle).

Some polarization imaging apparatuses are provided with a polarizer between the target object and an image sensor, and the image sensor can obtain polarized images with different polarization angles by driving the polarizer to deflect. However, such polarization imaging apparatuses has defects such as a low processing efficiency, a slow speed and a big error.

SUMMARY

The following is a summary of subject matter described in detail herein. This summary is not intended to limit the protection scope of the claims.

In one aspect, an embodiment of the present disclosure provides a polarization imaging apparatus, which includes an optical rotation device, a lens device, an image sensor, an image processor and a controller which are sequentially arranged along a ray direction of incident light.

The controller is connected with the optical rotation device, the lens device, and the image sensor respectively, and is configured to control the optical rotation device to be in a first optical rotation state or a second optical rotation state, control the lens device to be in an in-focus state or an out-of-focus state, and control the image sensor to collect light passing through the optical rotation device and the lens device to obtain multiple images; wherein a difference between an optical rotation angle of the second optical rotation state and an optical rotation angle of the first optical rotation state is equal to 90 degrees.

The image processor is connected with the image sensor and is configured to obtain polarized image information according to the multiple images.

In an exemplary embodiment, the optical rotation device includes a twist nematic liquid crystal cell. When the twist nematic liquid crystal cell is in the first optical rotation state, a polarization direction of light passing through the twist nematic liquid crystal cell is not rotated, and when the twist nematic liquid crystal cell is in the second optical rotation state, a polarization direction of light passing through the twist nematic liquid crystal cell is rotated by 90 degrees.

In an exemplary embodiment, the lens device includes a liquid crystal lens, or includes a liquid crystal lens and a glass lens. When the liquid crystal lens is in the out-of-focus state, light passing through the liquid crystal lens is not modulated, and when the liquid crystal lens is in the in-focus state, a polarization component, in a set direction, of light passing through the liquid crystal lens is modulated.

In an exemplary embodiment, the controller includes a twist nematic liquid crystal driving circuit, a first control circuit, and a third control circuit.

The twist nematic liquid crystal driving circuit is connected with the twist nematic liquid crystal cell and the first control circuit respectively, and is configured to control the twist nematic liquid crystal cell to be in the first optical rotation state or the second optical rotation state according to a control instruction sent by the first control circuit.

The first control circuit is connected with the twist nematic liquid crystal driving circuit, and is configured to control the twist nematic liquid crystal driving circuit by sending a control signal.

The third control circuit is connected with the image sensor, and is configured to control the image sensor by sending a control signal.

In an exemplary embodiment, the controller includes a liquid crystal lens driving circuit, a second control circuit, and a third control circuit.

The liquid crystal lens driving circuit is connected with the liquid crystal lens and the second control circuit respectively, and is configured to control the liquid crystal lens to be in the in-focus state or the out-of-focus state according to a control instruction sent by the second control circuit.

The second control circuit is connected with the liquid crystal lens driving circuit, and is configured to control the liquid crystal lens driving circuit by sending a control signal.

The third control circuit is connected with the image sensor, and is configured to control the image sensor by sending a control signal.

In an exemplary embodiment, the multiple images include: an original image obtained by the image sensor when the optical rotation device is in the first optical rotation state and the lens device is in the out-of-focus state; a first image obtained by the image sensor when the optical rotation device is in the first optical rotation state and the lens device is in the in-focus state; and a second image obtained by the image sensor when the optical rotation device is in the second optical rotation state and the lens device is in the in-focus state.

In an exemplary embodiment, the multiple images include: an original image obtained by the image sensor when the optical rotation device is in the second optical rotation state and the lens device is in the out-of-focus state; a second image obtained by the image sensor when the optical rotation device is in the second optical rotation state and the lens device is in the in-focus state; and a first image obtained by the image sensor when the optical rotation device is in the first optical rotation state and the lens device is in the in-focus state.

In an exemplary embodiment, the multiple images include: an original image obtained by the image sensor when the optical rotation device is in the second optical rotation state and the lens device is in the out-of-focus state; a first image obtained by the image sensor when the optical rotation device is in the first optical rotation state and the lens device is in the in-focus state; and a second image obtained by the image sensor when the optical rotation device is in the second optical rotation state and the lens device is in the in-focus state.

In an exemplary embodiment, the multiple images include: an original image obtained by the image sensor when the optical rotation device is in the first optical rotation state and the lens device is the an out-of-focus state; a second image obtained by the image sensor when the optical rotation device is in the second optical rotation state and the lens device is in the in-focus state; and a first image obtained by the image sensor when the optical rotation device is in the first optical rotation state and the lens device is in the in-focus state.

In an exemplary embodiment, the polarized image information includes one or more of the following information: a polarized image in a first direction, a polarized image in a second direction, a complete polarized image, and a difference between the polarized image in the first direction and the polarized image in the second direction, the first direction being perpendicular to the second direction; wherein, the polarized image in the first direction=a first image−an original image, the polarized image in the second direction=a second image−the original image, the complete polarized image=a result of subtracting the original image from the first image+a result of subtracting the original image from the second image, the difference between the polarized image in the first direction and the polarized image in second direction=the result of subtracting the original image from the first image−the result of subtracting the original image from the second image (i.e., the first image−the second image).

On another aspect, an embodiment of the present disclosure further provides a polarization imaging method, in which an optical rotation device, a lens device and an image sensor are sequentially arranged along a ray direction of incident light, and the method includes:

controlling the optical rotation device to be in a first or second optical rotation state, controlling the lens device to be in an in-focus or out-of-focus state, and controlling the image sensor to collect light passing through the optical rotation device and the lens device to obtain multiple images; wherein a difference between an optical rotation angle of the second optical rotation state and an optical rotation angle of the first optical rotation state is equal to 90 degrees; and obtaining polarized image information according to the multiple images.

In an exemplary embodiment, the optical rotation device includes a twist nematic liquid crystal cell. When the twist nematic liquid crystal cell is controlled to be in the first optical rotation state, a polarization direction of light passing through the twist nematic liquid crystal cell is not rotated, and when the twist nematic liquid crystal cell is controlled to be in the second optical rotation state, a polarization direction of light passing through the twisted nematic liquid crystal cell is rotated by 90 degrees.

In an exemplary embodiment, the lens device includes a liquid crystal lens, or includes a liquid crystal lens and a glass lens. Light passing through the liquid crystal lens is not modulated when the liquid crystal lens is controlled to be in the out-of-focus state, and a polarization component, in a set direction, of light passing through the liquid crystal lens is modulated when the liquid crystal lens is controlled to be in the in-focus state.

In an exemplary embodiment, controlling the optical rotation device to be in the first optical rotation state or the second optical rotation state, controlling the lens device to be in the in-focus state or the out-of-focus state, and controlling the image sensor to collect light passing through the optical rotation device and the lens device to obtain the multiple images includes:

controlling the optical rotation device to be in the first optical rotation state, controlling the lens device to be in the out-of-focus state, and controlling the image sensor to obtain an original image;

controlling the optical rotation device to be in the first optical rotation state, controlling the lens device to be in the in-focus state, and controlling the image sensor to obtain a first image; and controlling the optical rotation device to be in the second optical rotation state, controlling the lens device to be in the in-focus state, and controlling the image sensor to obtain a second image.

In an exemplary embodiment, controlling the optical rotation device to be in the first optical rotation state or the second optical rotation state, controlling the lens device to be in the in-focus state or the out-of-focus state, and controlling the image sensor to collect light passing through the optical rotation device and the lens device to obtain multiple images includes:

controlling the optical rotation device to be in the second optical rotation state, controlling the lens device to be in the out-of-focus state, and controlling the image sensor to obtain an original image;

controlling the optical rotation device to be in the second optical rotation state, controlling the lens device to be in the in-focus state, and controlling the image sensor to obtain a second image; and controlling the optical rotation device to be in the first optical rotation state, controlling the lens device to be in the in-focus state, and controlling the image sensor to obtain a first image.

In an exemplary embodiment, controlling the optical rotation device to be in the first optical rotation state or the second optical rotation state, controlling the lens device to be in the in-focus state or the out-of-focus state, and controlling the image sensor to collect light passing through the optical rotation device and the lens device to obtain multiple images includes:

controlling the optical rotation device to be in the first optical rotation state, controlling the lens device to be in the in-focus state, and controlling the image sensor to obtain a first image;

controlling the optical rotation device to be in the second optical rotation state, controlling the lens device to be in the in-focus state, and controlling the image sensor to obtain a second image; and controlling the optical rotation device to be in the second optical rotation state, controlling the lens device to be in the out-of-focus state, and controlling the image sensor to obtain an original image.

In an exemplary embodiment, controlling the optical rotation device to be in the first optical rotation state or the second optical rotation state, controlling the lens device to be in the in-focus state or the out-of-focus state, and controlling the image sensor to collect light passing through the optical rotation device and the lens device to obtain multiple images includes:

controlling the optical rotation device to be in the second optical rotation state, controlling the lens device to be in the in-focus state, and controlling the image sensor to obtain a second image;

controlling the optical rotation device to be in the first optical rotation state, controlling the lens device to be in the in-focus state, and controlling the image sensor to obtain a first image; and controlling the optical rotation device to be in the first optical rotation state, controlling the lens device to be in the out-of-focus state, and controlling the image sensor to obtain an original image.

In an exemplary embodiment, obtaining polarization image information according to the multiple images includes one or more of the following:

subtracting the original image from the first image to obtain a polarized image in a first direction;

subtracting the original image from the second image to obtain a polarized image in a second direction;

adding a result of subtracting the original image from the first image and a result of subtracting the original image from the second image to obtain a complete polarized image;

subtracting the second image from the first image to obtain a difference between the polarized image in the first direction and the polarized image in the second direction;

wherein, the first direction is perpendicular to the second direction.

In another aspect, an embodiment of the present disclosure also provides a controller, which includes a memory, a processor and a computer program stored on the memory and capable of running on the processor, and the acts in the polarization imaging method are implemented when the processor executes the program.

In another aspect, an embodiment of the present disclosure also provides a computer readable storage medium storing executable instructions. When the executable instructions are executed by a processor, the polarization imaging method as described in any one of the above is implemented.

Other features and advantages of the present disclosure will be set forth in specific embodiments below, and in part will become apparent from the embodiments of the specification, or may be learned by practice the embodiments of the present disclosure.

Other aspects will become apparent upon reading and understanding accompanying drawings and the detailed description.

BRIEF DESCRIPTION OF DRAWINGS

Accompanying drawings are used to provide an understanding of technical solutions of the present disclosure and form a part of the specification. Together with embodiments of the present disclosure, they are used to explain technical solutions of the present disclosure but do not constitute a limitation on the technical solutions of the present disclosure. Shapes and sizes of the components in the drawings do not reflect true proportions, and the purpose is only for schematically describing contents of embodiments of the present disclosure.

FIG. 3 is a schematic diagram of a structure of a polarization imaging apparatus according to another exemplary embodiment of the present disclosure.

FIG. 4 is a flowchart of a polarization imaging method according to an exemplary embodiment of the present disclosure.

ILLUSTRATION OF REFERENCE SIGNS

10—Optical rotation device
11—TN liquid crystal cell
20—Lens device
21—Liquid crystal lens
22—Glass lens
30—Image sensor
40—Image processor
50—Controller
51—TN liquid crystal driving circuit
52—Liquid crystal lens driving circuit
53—Control circuit
531—First control circuit
532—Second control circuit
533—Third control circuit
600—Controller
610—Processor
620—Memory

DETAILED DESCRIPTION

The following embodiments serve to illustrate the present disclosure, but are not intended to limit the scope of the present disclosure. The embodiments in the present disclosure and features in the embodiments can be combined with each other arbitrarily if there is no conflict.

Some polarization imaging apparatuses are provided with a polarizer between a target object and an image sensor. However, due to the need of an additional installation structure and driving structure, for such polarization imaging apparatuses, their structures are complex, operations are cumbersome, and errors are easily introduced by mechanical movement, therefore such polarization imaging apparatuses have defects such as a low processing efficiency, a slow speed and a big error.

Figure 1:
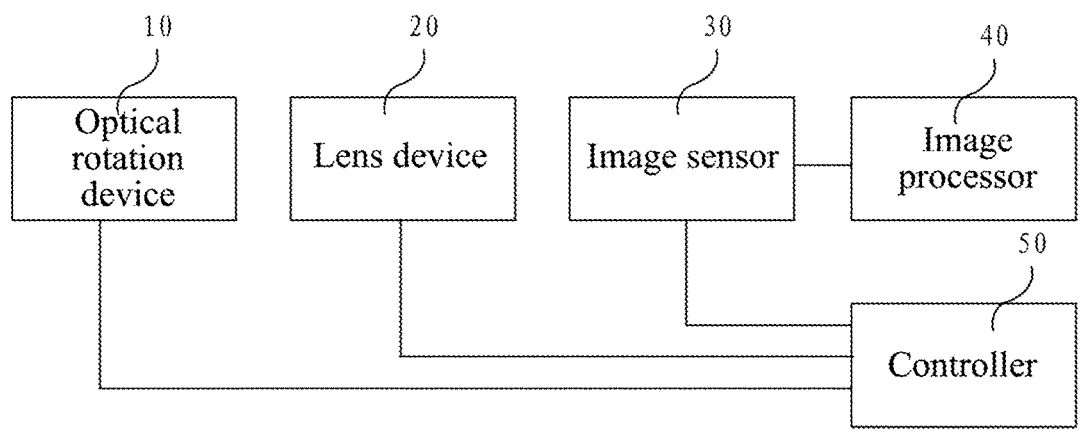
FIG. 1 is a schematic diagram of a structure of a polarization imaging apparatus according to an exemplary embodiment of the present disclosure.

An embodiment of the present disclosure provides a polarization imaging apparatus. FIG. 1 is a schematic diagram of a structure of a polarization imaging apparatus in an exemplary embodiment of the present disclosure. As shown in FIG. 1, the polarization imaging apparatus of this embodiment includes an optical rotation device 10, a lens device 20, an image sensor 30, an image processor 40 and a controller 50. The optical rotation device 10, the lens device 20 and the image sensor 30 are sequentially arranged along a ray direction of incident light from a target object. That is, the optical rotation device 10 is arranged at a side of the target object, the lens device 20 is arranged at a side of the optical rotation device 10 away from the target object, and the image sensor 30 is arranged on a side of the lens device 20 away from the target object, and the optical rotation device 10, the lens device 20 and the image sensor 30 are all located on the incident light.

The optical rotation device 10 is connected with the controller 50, and is configured to be in a first optical rotation state or a second optical rotation state under control of the controller 50; wherein a difference between an optical rotation angle of the second rotation state and an optical rotation angle of the first rotation state is equal to 90 degrees.

The lens device 20 is connected with the controller 50, and is configured to be in an in-focus state or an out-of-focus state under the control of the controller 50.

The image sensor 30 is connected with the controller 50, and is configured to collect light passing through the optical rotation device 10 and the lens device 20 under the control of the controller 50 to obtain multiple images.

The image processor 40 is connected with the image sensor 30, and is configured to obtain multiple images from the image sensor 30 and obtain polarized image information according to the multiple images.

The controller 50 is connected with the optical rotation device 10, the lens device 20, and the image sensor 30 respectively, and is configured to control the optical rotation device 10 to be in the first or second optical rotation state, control the lens device 20 to be in the in-focus or out-of-focus state, and control the image sensor 30 to collect light passing through the optical rotation device 10 and the lens device 20 to obtain multiple images.

When the optical rotation device 10 is in the first optical rotation state, a polarization direction of light passing through the optical rotation device 10 is not rotated, and when the optical rotation device 10 is in the second optical rotation state, a polarization direction of light passing through the optical rotation device 10 is rotated by 90 degrees, that is, orthogonally rotated.

The light passing through the lens device 20 is not modulated when the lens device 20 is in the out-of-focus state, and a polarization component, in a set direction, of light passing through the lens device 20 is modulated when the lens device 20 is in the in-focus state.

The multiple images are images obtained after passing through the optical rotation device 10 and the lens device 20. The images are images obtained after processed as follows: images obtained after the optical rotation device 10 orthogonally rotates the incident light and the lens device 20 modulates a polarization component, in a set direction, of the light; or, images obtained after the optical rotation device 10 does not rotate the incident light orthogonally and the lens device 20 modulates a polarization component, in a set direction, of the light; or, images obtained after the optical rotation device 10 orthogonally rotates the incident light and the lens device 20 does not modulate a polarization component, in a set direction, of the light; or, images obtained after the optical rotation device 10 does not rotate the incident light orthogonally and the lens device 20 does not modulate a polarization component, in a set direction, of the light.

In an exemplary embodiment of the present disclosure, the optical rotation device 10 may adopt a Twist Nematic (TN) liquid crystal cell for processing a polarization state of the incident light, that is, orthogonally rotating the polarization direction of the incident light. Herein, the first optical rotation state means that the TN liquid crystal cell works at a 0-degree optical rotation state, and the second optical rotation state means that the TN liquid crystal cell works at a 90-degree optical rotation state. When the TN liquid crystal cell works at the 0-degree optical rotation state (the first optical rotation state), the polarization direction of incident light is not rotated after the incident light passes through the TN liquid crystal cell. When the TN liquid crystal cell works at the 90-degree optical rotation state (the second optical rotation state), the polarization direction of incident light is rotated by 90 degrees after the incident light passes through the TN liquid crystal cell. The TN liquid crystal cell includes a first substrate and a second substrate which are opposite arranged, wherein, the liquid crystal is arranged between the first substrate and the second substrate; the first substrate is provided with a first electrode and the second substrate is provided with a second electrode. Voltage is applied on the first electrode and the second electrode to drive the liquid crystal to deflect, then the TN liquid crystal cell is in the 90-degree optical rotation state, the polarization direction of incident light is changed. No voltage is applied on the first electrode and the second electrode, then the TN liquid crystal cell is in the 0-degree optical rotation state, and the polarization direction of incident light is not be changed.

In an exemplary embodiment of the present disclosure, the lens device 20 may adopt a liquid crystal lens for modulating light polarized in a crystal axis direction, that is, modulating light of a polarization component in a set direction. The liquid crystal lens has two states: in-focus state or out-of-focus state. When the liquid crystal lens is in the out-of-focus state, the liquid crystal lens does not modulate the light passing through the optical rotation device; and when the liquid crystal lens is in the in-focus state, the liquid crystal lens modulates a polarization component, in a set direction, of light passing through the optical rotation device. The liquid crystal lens includes a liquid crystal layer, an alignment layer, a first electrode, a second electrode and a voltage driving circuit, wherein, the first electrode, the alignment layer, the liquid crystal layer and the second electrode are sequentially arranged along a ray direction of the incident light. Working principle of the liquid crystal lens is as follows: when the voltage driving circuit does not apply a driving voltage, liquid crystal molecules of the liquid crystal layer are arranged along a direction of the alignment layer, and all polarization directions of the incident light do not change original propagation directions after the incident light transmits the liquid crystal lens. The state in this case is referred to as the liquid crystal lens being in the out-of-focus state. When the voltage driving circuit applies a driving voltage, an electric field distribution which is generated between the first electrode and the second electrode changes an arrangement direction angle of liquid crystal molecules in the liquid crystal layer. For the incident light of which the polarization direction is perpendicular to the alignment direction of liquid crystal molecules, the liquid crystal layer will not change its propagation direction, and the incident light will directly transmit. For the incident light of which the polarization direction is parallel to the alignment direction of liquid crystal molecules, the liquid crystal layer will change its propagation direction. The state in this case is referred to as the liquid crystal lens being in the in-focus state.

In an exemplary embodiment, considering a large focal length of the liquid crystal lens, the lens device 20 may adopt a combined structure of a liquid crystal lens and a glass lens, and the liquid crystal lens and the glass lens are combined to modulate incident light of a polarization component in a set direction.

An embodiment of the present disclosure provides a polarization imaging apparatus. By setting (controlling) the optical rotation device to be in the first optical rotation state or the second optical rotation state, and setting (controlling) the lens device to be in the in-focus state or the out-of-focus state, the image sensor collects light passing through the optical rotation device and the lens device, and obtains multiple images, and the image processor obtains the polarized image information according to the multiple images, and obtains a polarized image of a target object partially polarized. The polarization imaging apparatus disclosed by an embodiment of the present disclosure needs neither the use of a polarizer nor the movement of a driving part, so that its structure is simple and operations are easy to handle, and a case that errors are easily introduced by mechanical movement is avoided, therefore it has characteristics of a high processing efficiency, a fast speed, a high accuracy and the like. Of course, it is not necessary to simultaneously achieve all of the advantages mentioned above for any product or method implemented through the embodiments of the present disclosure.

Figure 2:
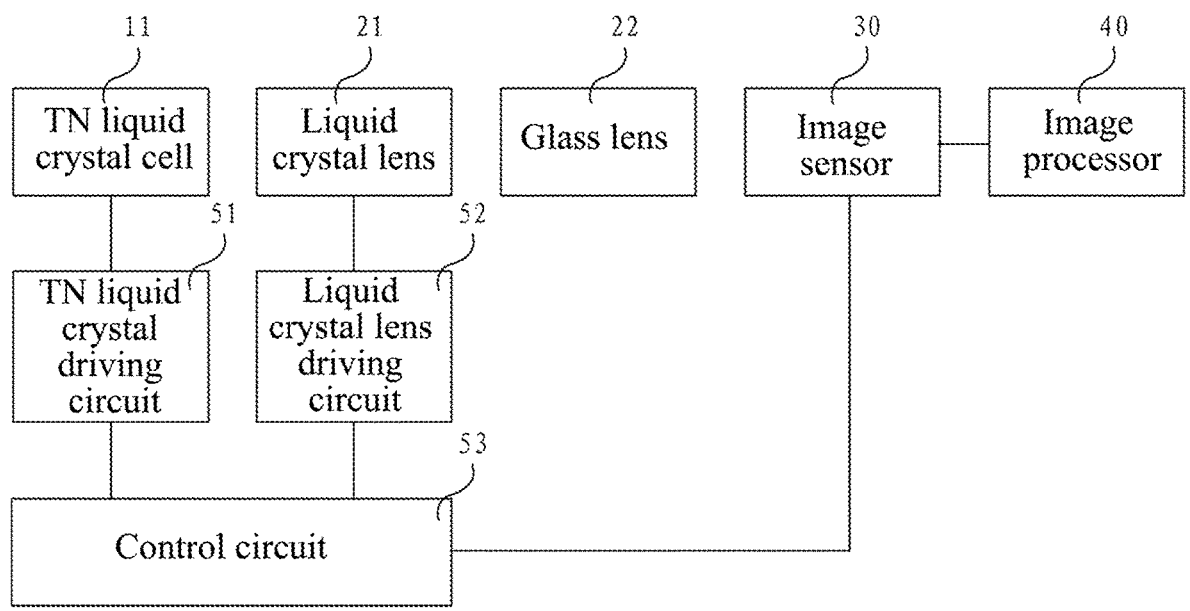
FIG. 2 is a schematic diagram of a structure of a polarization imaging apparatus according to another exemplary embodiment of the present disclosure.

FIG. 2 is a schematic diagram of a structure of a polarization imaging apparatus according to an exemplary embodiment of the present disclosure. As shown in FIG. 2, the polarization imaging apparatus of this embodiment includes a TN liquid crystal cell 11, a liquid crystal lens 21, a glass lens 22, an image sensor 30, an image processor 40, a TN liquid crystal driving circuit 51, a liquid crystal lens driving circuit 52 and a control circuit 53. The liquid crystal lens 21 and the glass lens 22 form a lens device; the TN liquid crystal driving circuit 51, the liquid crystal lens driving circuit 52 and the control circuit 53 form a control device, and the TN liquid crystal cell 11 serves as an optical rotation device.

The TN liquid crystal driving circuit 51 is connected with the TN liquid crystal cell 11 and the control circuit 53 respectively, and is configured to control the TN liquid crystal cell 11 to be in a first optical rotation state or a second optical rotation state according to a control instruction sent by the control circuit 53, that is, to control the TN liquid crystal cell 11 to perform or not perform an orthogonal rotation on a polarization state of incident light.

The liquid crystal lens driving circuit 52 is connected with the liquid crystal lens 21 and the control circuit 53 respectively, and is configured to control the liquid crystal lens 21 to be in an in-focus state or an out-of-focus state according to a control instruction sent by the control circuit 53, that is, to control the liquid crystal lens 21 to modulate or not modulate a polarization component, in a set direction, of light.

The image sensor 30 is connected with the control circuit 53, and is configured to collect light passing through the TN liquid crystal cell 11, the lens device 20, and the glass lens 22 according to a control instruction sent by the control circuit 53, to obtain multiple images.

The image processor 40 is connected with the image sensor 30, and is configured to obtain multiple images from the image sensor 30 and obtain polarized image information according to the multiple images.

The control circuit 53 is connected with the TN liquid crystal driving circuit 51, the liquid crystal lens driving circuit 52, and the image sensor 30 respectively, and is configured to control the TN liquid crystal driving circuit 51, the liquid crystal lens driving circuit 52, and the image sensor 30 respectively by sending a control signal.

The target object is located at one side of the TN liquid crystal cell 11. The TN liquid crystal cell 11, the liquid crystal lens 21, the glass lens 22, and the image sensor 30 are sequentially arranged along a ray direction of incident light from the target object. Optionally, the glass lens 22 may also be arranged between the TN liquid crystal cell 11 and the liquid crystal lens 21.

The glass lens may be used to increase a focal length of the liquid crystal lens, and may be arranged at one side or both sides of the liquid crystal lens 21. In an exemplary embodiment, the glass lens may not be provided if the focal length of the liquid crystal lens can meet the requirements. In another exemplary embodiment, the glass lens may be composed of a single lens or a group of lenses (i.e., multiple lenses).

In an exemplary embodiment, as shown in FIG. 3, the controller 53 may include a first control circuit 531, a second control circuit 532, and a third control circuit 533.

In an exemplary embodiment, when the optical rotation device includes a twisted nematic liquid crystal cell, the controller may include a twisted nematic liquid crystal driving circuit, a first control circuit, and a third control circuit.

The twist nematic liquid crystal driving circuit is connected with the twist nematic liquid crystal cell and the first control circuit respectively, and is configured to control the twist nematic liquid crystal cell to be in a first optical rotation state or a second optical rotation state according to a control instruction sent by the first control circuit.

The first control circuit, connected with the twist nematic liquid crystal driving circuit, is configured to control the twist nematic liquid crystal driving circuit by sending a control signal.

The third control circuit is connected with the image sensor, and is configured to control the image sensor by sending a control signal.

In an exemplary embodiment, when the lens device includes a liquid crystal lens, or includes a liquid crystal lens and a glass lens, the controller may include a liquid crystal lens driving circuit, a second control circuit, and a third control circuit.

The liquid crystal lens driving circuit is connected with the liquid crystal lens and the second control circuit respectively, and is configured to control the liquid crystal lens to be in an in-focus state or an out-of-focus state according to a control instruction sent by the second control circuit.

The second control circuit is connected with the liquid crystal lens driving circuit, and is configured to control the liquid crystal lens driving circuit by sending a control signal.

The third control circuit is connected with the image sensor, and is configured to control the image sensor by sending a control signal.

Since incident light (or called object light) from the target object is natural light, the object light may be regarded as light composed of two parts of polarized light with orthogonal polarization directions: X-direction polarized light and Y-direction polarized light, that is, $I=I_x+I_y$, wherein, I represents the object light, $I_x$ represents a polarized light component of the object light in an X direction, and $I_y$ represents a polarized light component of the object light in a Y direction.

In this embodiment, assuming that the first direction is the X-direction and the second direction is the Y-direction, an alignment direction of the alignment layer in the liquid crystal lens 21 is set as the X direction. Since the liquid crystal lens in focus only modulates the light with a polarization direction being the same as the alignment direction of the liquid crystal lens, the liquid crystal lens 21 only modulates the X-direction polarization component of the incident light of the liquid crystal lens, that is, the set direction (the X direction) in this embodiment, of the light incident on the liquid crystal lens. The Y direction may also be the set direction in other embodiments, its implementation is the same as that of the X direction, which will not be described repeatedly here.

Firstly, the TN liquid crystal cell 11 is controlled to work in a 0-degree optical rotation state (a first optical rotation state, also called an inoperative state of the TN liquid crystal cell, in which a voltage is not applied to the first and second electrodes of the TN liquid crystal cell 11), and the liquid crystal lens 21 is controlled to be in an out-of-focus state (also called an inoperative state of the liquid crystal lens, in which a driving voltage is not applied by a voltage driving circuit of the liquid crystal lens). In this case, the polarization state of the object light does not change when the object light passes through the TN liquid crystal cell 11, and its X-direction polarized light component and Y-direction polarized light component are not modulated when it passes through the liquid crystal lens 21, thereby the X-direction polarized light component and Y-direction polarized light component of the object light are imaged on the image sensor. An image obtained by the image sensor 30 is an original image Img0 of the target object, Img0=$I_x$+$I_y$.

Then, the TN liquid crystal cell 11 is kept to work in the 0-degree optical rotation state, and the liquid crystal lens 21 is controlled to be in an in-focus state (also called an operative state of the liquid crystal lens, in which a driving voltage is applied by a voltage driving circuit of the liquid crystal lens). In this case, the polarization state of the object light does not change when the object light passes through the TN liquid crystal cell 11. However, when the object light passes through the liquid crystal lens 21, the X-direction polarized component of the object light is modulated by the liquid crystal lens 21, and the Y-direction polarized component is not modulated, thereby an X-direction polarized component modulated by the liquid crystal lens 21 and the Y-direction polarized component of the object light are imaged on the image sensor. The image sensor 30 obtains a first image Img1, Img1=$I_{x1}$+$I_y$, wherein, $I_{x1}$ represents the X-direction polarization component, modulated by the liquid crystal lens, of the object light.

After that, the TN liquid crystal cell 11 is controlled to work in a 90-degree optical rotation state (a second optical rotation state, also called an operative state of the TN liquid crystal cell, in which a voltage is applied to the first and second electrodes of the TN liquid crystal cell 11), and the liquid crystal lens 21 is kept to be in an in-of-focus state. In this case, when the object light passes through the TN liquid crystal cell 11, the polarization state of the object light is rotated orthogonally, and X-direction polarized light of the object light is converted into Y-direction polarized light, and Y-direction polarized light is converted into X-direction polarized light. When the orthogonally rotated light passes through the liquid crystal lens 21, the liquid crystal lens 21 modulates an X-direction polarization component of the light, but does not modulate a Y-direction polarization component of the light, that is, the Y-direction polarized light of the object light is modulated, and the X-direction polarized light of the object light is not modulated. Thereby the X-direction polarization component of the object light and the Y-direction polarization component modulated by the liquid crystal lens 21 are imaged on the image sensor, and a second image Img2 is obtained by the image sensor 30, Img2=$I_x$+$I_{y1}$, wherein, $I_{y1}$ represents the Y-direction polarization component, modulated by the liquid crystal lens, of the object light.

In this way, by controlling the TN liquid crystal cell 11 to perform or not perform orthogonal rotation on the polarization state of the light, and controlling the lens device 20 to modulate or not modulate the X-direction polarization component of the light, the image sensor 30 obtains three images: the original image Img0, the first image Img1 and the second image Img2. The original image Img0 is an image obtained when the TN liquid crystal cell 11 is in the 0-degree optical rotation state (in which the object light is not orthogonally rotated) and the lens device 20 is in the out-of-focus state (in which the light is not modulated). The first image Img1 is an image obtained when the TN liquid crystal cell 11 is in the 0-degree optical rotation state (in which the object light is not orthogonally rotated) and the lens device 20 is in the in-focus state (in which the light is modulated). The second image Img2 is an image obtained when the TN liquid crystal cell 11 is in the 90-degree optical rotation state (in which the object light is orthogonally rotated) and the lens device 20 is in the in-focus state (in which the light is modulated).

The aforementioned order of obtaining the original image Img0, the first image Img1 and the second image Img2 is only an example. In other embodiments, images may be obtained in different orders, for example, the first image Img1 and the second image Img2 are obtained first, and then the original image Img0 is obtained. The order of obtaining the images is not limited in this document, and no further examples will be provided here one by one for the different orders.

After the image sensor 30 obtains the original image Img0, first image Img1, and second image Img2, the image sensor 30 sends them to the image processor 40, and the image processor 40 processes the original image Img0, first image Img1, and second image Img2 to obtain corresponding polarized image information.

For example, processing, by the image processor 40, the original image Img0, the first image Img1, and the second image Img2 to obtain corresponding polarization image information, includes, but is not limited to, one or more of the following processing.

1. Subtracting the original image Img0 from the first image Img1

$$\text{Img1}-\text{Img0}=(I_{x1}+I_y)-(I_x+I_y)=I_{x1}-I_x$$

($I_{x1}$−$I_x$) represents subtracting an out-of-focus image not modulated by the liquid crystal lens from an in-focus image modulated by the liquid crystal lens in the X direction of the object light, that is, an X-direction polarized image of the object light.

2. Subtracting the original image Img0 from the second image Img2

$$\text{Img2}-\text{Img0}=(I_x+I_{y1})-(I_x+I_y)=I_{y1}-I_y$$

($I_{y1}$−$I_y$) represents subtracting an out-of-focus image not modulated by the liquid crystal lens from an in-focus image modulated by the liquid crystal lens in the Y direction of the object light, that is, a Y-direction polarized image of the object light.

3. Adding a result of Img1-Img2 and a result of Img2-Img0

$$\text{Img1}-\text{Img0}+\text{Img2}-\text{Img0}=I_{x1}-I_x+I_{y1}-I_y$$

$(I_{x1}-I_x+I_{y1}-I_y)$ represents a complete polarized image of the object light.

4. Subtracting the second image Img2 from the first image Img1

$$\text{Img1}-\text{Img2}=(I_{x1}+I_y)-(I_x+I_{y1})=I_{x1}-I_x+I_y-I_{y1}$$

When the object light is partially polarized light, its X-direction polarization component is not equal to its Y-direction polarization component, $(I_{x1}-I_x+I_y-I_{y1})$ represents a difference between the X-direction polarized image and the Y-direction polarized image of the object light.

If it is necessary to obtain multiple pieces of the above pieces of polarized image information, a calculation order is not limited.

It can be seen from the above description, in the polarization imaging apparatus provided in this embodiment, the TN liquid crystal cell is adopted to perform or not perform orthogonal rotation (change the polarization direction of the object light) on the polarization state of the object light, the liquid crystal lens is adopted to perform or not perform X-direction polarization component modulation on the orthogonally rotated light to obtain three images, and a complete polarization image and polarized images in two orthogonal directions can be obtained according to simple calculation for the three images, thus imaging of partial polarized light is realized. Neither the use of a polarizer nor the movement of a driving part is needed, so that its structure is simple and operations are easy to handle, and a case that errors are easily introduced by mechanical movement is avoided, therefore it has characteristics of a high processing efficiency, a fast speed, a high accuracy and the like.

In another exemplary embodiment, using the polarization imaging apparatus shown in FIG. 2, three images may be obtained by another process. In this embodiment, it is also assumed that an alignment direction of the alignment layer in the liquid crystal lens is the X-direction. The process of obtaining three images in this embodiment is as follows.

Firstly, the TN liquid crystal cell 11 is controlled to work in a 90-degree optical rotation state, and the liquid crystal lens 21 is controlled to be in an out-of-focus state. In this case, when the object light passes through the TN liquid crystal cell 11, the polarization state of the object light is rotated orthogonally, and X-direction polarized light of the object light is converted into Y-direction polarized light, and Y-direction polarized light is converted into X-direction polarized light. Since an X-direction polarized light component and Y-direction polarized light component of the object light are not modulated when the object light passes through the liquid crystal lens 21, thereby the X-direction polarized light component and Y-direction polarized light component of the object light are imaged on the image sensor. An image obtained by the image sensor 30 is an original image Img0 of the target object, $\text{Img0}=I_x+I_y$.

Then, the TN liquid crystal cell 11 is kept to work in the 90-degree rotation state, and the liquid crystal lens 21 is controlled to be in an in-focus state. In this case, when the object light passes through the TN liquid crystal cell 11, the polarization state of the object light is rotated orthogonally, and X-direction polarized light of the object light is converted into Y-direction polarized light, and Y-direction polarized light is converted into X-direction polarized light. When the light passes through the liquid crystal lens 21, the liquid crystal lens 21 modulates an X-direction polarization component of light (i.e., the Y-direction polarization component of the object light), while a Y-direction polarization component of the light (i.e., the X-direction polarization component of the object light) is not modulated, thereby the X-direction polarization component of the object light and the Y-direction polarization component modulated by the liquid crystal lens 21 are imaged on the image sensor. The image sensor 30 obtains a second image Img2, $\text{Img2}=I_x+I_{y1}$, wherein, $I_{y1}$ represents the Y-direction polarization component, modulated by the liquid crystal lens, of the object light.

Thereafter, the TN liquid crystal cell 11 is controlled to work in a 0-degree optical rotation state, and the liquid crystal lens 21 is kept to be in the in-focus state. In this case, the polarization state of the object light does not change when the object light passes through the TN liquid crystal cell 11. When the object light passes through the liquid crystal lens 21, an X-direction polarized component of the light is modulated by the liquid crystal lens 21, and a Y-direction polarized component is not modulated, thereby the X-direction polarized component modulated by the liquid crystal lens 21 and the Y-direction polarized component of the object light are imaged on the image sensor, and the image sensor 30 obtains a first image Img1, $\text{Img1}=I_{x1}+I_y$, wherein, $I_{x1}$ represents the X-direction polarization component, modulated by the liquid crystal lens, of the object light.

In this way, by controlling the TN liquid crystal cell 11 to perform or not perform orthogonal rotation on the polarization state of the light, and controlling the lens device 20 to modulate or not modulate the X-direction polarization component of the light, the image sensor 30 obtains three images: the original image Img0, the first image Img1 and the second image Img2. The original image Img0 is an image obtained when the TN liquid crystal cell 11 is in the 90-degree rotation state (in which the object light is orthogonally rotated) and the lens device 20 is in the out-of-focus state (in which light is not modulated). The first image Img1 is an image obtained when the TN liquid crystal cell 11 is in the 0-degree optical rotation state (in which the object light is not rotated orthogonally) and the lens device 20 is in the in-focus state (in which the light is modulated). The second image Img2 is an image obtained when the TN liquid crystal cell 11 is in the 90-degree rotation state (in which the object light is orthogonally rotated) and the lens device 20 is in the in-focus state (in which the light is modulated).

The aforementioned order of obtaining the original image Img0, the first image Img1 and the second image Img2 is only an example. In other embodiments, images may be obtained in different orders. The order of obtaining the images is not limited in this document, and no further examples will be provided here one by one for the different orders.

Lastly, the image processor 40 processes the original image Img0, the first image Img1, and the second image Img2 to obtain corresponding polarized image information, which includes an X-direction polarized image of the object light, a Y-direction polarized image of the object light, a complete polarized image of the object light, and a difference between the X-direction polarized image and the Y-direction polarized image. The processing process is the same as that in the above embodiments, and will not be described repeatedly here.

This embodiment also has the characteristics such as the high processing efficiency, the fast speed and the high accuracy.

In another exemplary embodiment, using the polarization imaging apparatus shown in FIG. 2, three images may be obtained by another process. In this embodiment, it is also assumed that an alignment direction of the alignment layer in the liquid crystal lens is the X-direction. The process of obtaining three images in this embodiment is as follows.

Firstly, the TN liquid crystal cell 11 is controlled to work in a 0-degree optical rotation state, and the liquid crystal lens 21 is controlled to be in an in-focus state. In this case, the polarization state of the object light does not change when the object light passes through the TN liquid crystal cell 11. However when it passes through the liquid crystal lens 21, an X-direction polarized component of the object light is modulated by the liquid crystal lens 21, and a Y-direction polarized component is not modulated, thereby an X-direction polarized component modulated by the liquid crystal lens 2 1and the Y-direction polarized component of the object light are imaged on the image sensor. The image sensor 30 obtains a first image Img1, $Img1=I_{x1}+I_y$.

Then, the TN liquid crystal cell 11 is controlled to work in a 90-degree optical rotation state, and the liquid crystal lens 21 is kept to be in the in-focus state. In this case, when the object light passes through the TN liquid crystal cell 11, the polarization state of the object light is rotated orthogonally, and X-direction polarized light of the object light is converted into Y-direction polarized light, and Y-direction polarized light is converted into X-direction polarized light. When light rotated orthogonally passes through the liquid crystal lens 21, the liquid crystal lens 21 modulates an X-direction polarization component of the light (i.e., the Y-direction polarization light of the object light), while a Y-direction polarization component (i.e., the X-direction polarization light of the object light) is not modulated, thereby the X-direction polarization component of the object light and the Y-direction polarization component modulated by the liquid crystal lens 21 are imaged on the image sensor. The image sensor 30 obtains a second image Img2, $Img2=I_x+I_{y1}$.

Thereafter, the TN liquid crystal cell 11 is kept to work in the 90-degree rotation state, and the liquid crystal lens 21 is controlled to be in an out-of-focus state. In this case, when the object light passes through the TN liquid crystal cell 11, the polarization state of the object light is rotated orthogonally, X-direction polarized light of the object light is converted into Y-direction polarized light, and Y-direction polarized light is converted into X-direction polarized light. An X-direction polarized light component and Y-direction polarized light component of the light are not modulated when the light passes through the liquid crystal lens 21, thereby the X-direction polarized light component and Y-direction polarized light component of the object light are imaged on the image sensor. An image obtained by the image sensor 30 is an original image Img0 of the target object, $Img0=I_x+I_y$.

In this way, by controlling the TN liquid crystal cell 11 to perform or not perform orthogonal rotation on the polarization state of the light, and controlling the lens device 20 to modulate or not modulate on the X-direction polarization component of the light, the image sensor 30 obtains three images: the original image Img0, the first image Img1 and the second image Img2. The original image Img0 is an image obtained when the TN liquid crystal cell 11 is in the 90-degree rotation state (in which the object light is orthogonally rotated) and the lens device 20 is in the out-of-focus state (in which light is not modulated). The first image Img1 is an image obtained when the TN liquid crystal cell 11 is in the 0-degree optical rotation state (in which the object light is not rotated orthogonally) and the lens device 20 is in the in-focus state (in which the light is modulated). The second image Img2 is an image obtained when the TN liquid crystal cell 11 is in the 90-degree rotation state (in which the object light is orthogonally rotated) and the lens device 20 is in the in-focus state (in which light is modulated).

The aforementioned order of obtaining the original image Img0, the first image Img1 and the second image Img2 is only an example. In other embodiments, images may be obtained in different orders. The order of obtaining the images is not limited in this document, and no further examples will be provided here one by one for the different orders.

Lastly, the image processor 40 processes the original image Img0, the first image Img1, and the second image Img2 to obtain corresponding polarized image information, which includes an X-direction polarized image of the object light, a Y-direction polarized image of the object light, a complete polarized image of the object light, and a difference between the X-direction polarized image and the Y-direction polarized image. The processing process is the same as that in the above embodiments, and will not be described repeatedly here.

Like the above embodiments, this embodiment has the characteristics such as the high processing efficiency, the fast speed and the high accuracy.

In another exemplary embodiment, using the polarization imaging apparatus shown in FIG. 2, three images may be obtained by another flow chart. In this embodiment, it is also assumed that an alignment direction of the alignment layer in the liquid crystal lens is the X-direction. The process of obtaining three images in this embodiment is as follows.

Firstly, the TN liquid crystal cell 11 is controlled to work in a 90-degree optical rotation state, and the liquid crystal lens 21 is controlled to be in an in-focus state. In this case, when the object light passes through the TN liquid crystal cell 11, the polarization state of the object light is rotated orthogonally, and X-direction polarized light of the object light is converted into Y-direction polarized light, and Y-direction polarized light is converted into X-direction polarized light. When the light passes through the liquid crystal lens 21, the liquid crystal lens 21 modulates an X-direction polarization component of the light (i.e., a Y-direction polarization component of the object light), while a Y-direction polarization component of the light (i.e., an X-direction polarization component of the object light) is not modulated, thereby the X-direction polarization component of the object light and the Y-direction polarization component modulated by the liquid crystal lens 21 are imaged on the image sensor. The image sensor 30 obtains a second image Img2, $Img2=I_x+I_{y1}$.

Then, the TN liquid crystal cell 11 is controlled to work in a 0-degree optical rotation state, and the liquid crystal lens 21 is kept to be in the in-focus state. In this case, the polarization state of the object light does not change when the object light passes through the TN liquid crystal cell 11. When the object light passes through the liquid crystal lens 21, an X-direction polarized component of the light is modulated by the liquid crystal lens 21, and a Y-direction polarized component is not modulated, thereby the X-direction polarized component modulated by the liquid crystal lens 21 and the Y-direction polarized component of the object light are imaged on the image sensor. The image sensor 30 obtains a first image Img1, $Img1=I_{x1}+I_y$, wherein, $I_{x1}$ represents the X-direction polarization component, modulated by the liquid crystal lens, of the object light.

Thereafter, the TN liquid crystal cell 11 is kept to be in the 0-degree rotation state, and the liquid crystal lens 21 is controlled to be in an out-of-focus state. In this case, the polarization state of the object light does not change when the object light passes through the TN liquid crystal cell 11, and an X-direction polarized light component and Y-direction polarized light component of the object light are not modulated when the object light passes through the liquid crystal lens 21, thereby the X-direction polarized light component and the Y-direction polarized light component of the object light are imaged on the image sensor. An image obtained by the image sensor 30 is an original image Img0 of the target object, Img0=$I_x$+$I_y$.

In this way, by controlling the TN liquid crystal cell 11 to perform or not perform orthogonal rotation on the polarization state of the light, and controlling the lens device 20 to modulate or not modulate on the X-direction polarization component of the light, the image sensor 30 obtains three images: the original image Img0, the first image Img1 and the second image Img2. The original image Img0 is an image obtained when the TN liquid crystal cell 11 is in the 0-degree optical rotation state (in which the object light is not orthogonally rotated) and the lens device 20 is in the out-of-focus state (in which the light is not modulated). The first image Img1 is an image obtained when the TN liquid crystal cell 11 is in the 0-degree optical rotation state (in which the object light is not orthogonally rotated) and the lens device 20 is in the in-focus state (in which the light is modulated). The second image Img2 is an image obtained when the TN liquid crystal cell 11 is in the 90-degree optical rotation state (in which the object light is orthogonally rotated) and the lens device 20 is in the in-focus state (in which the light is modulated).

The aforementioned order of obtaining the original image Img0, the first image Img1 and the second image Img2 is only an example. In other embodiments, images may be obtained in different orders. The order of obtaining the images is not limited in this document, and no further examples will be provided here one by one for the different orders.

Lastly, the image processor 40 processes the original image Img0, the first image Img1, and the second image Img2 to obtain corresponding polarized image information, which includes an X-direction polarized image of the object light, a Y-direction polarized image of the object light, a complete polarized image of the object light, and a difference between the X-direction polarized image and the Y-direction polarized image. The processing process is the same as that in the above embodiments, and will not be described repeatedly here.

Like the above embodiments, this embodiment has the characteristics such as the high processing efficiency, the fast speed and the high accuracy.

Based on a systematical architecture of the polarization imaging apparatus in the foregoing embodiments, an embodiment of the present disclosure also provides a polarization imaging method. In the polarization imaging method of the embodiment of the present disclosure, an optical rotation device, a lens device and an image sensor are sequentially arranged along a ray direction of incident light. As shown in FIG. 4, the method includes the following acts S1-S2.

In S1, the optical rotation device is controlled to be in a first or second optical rotation state, the lens device is controlled to be in an in-focus or out-of-focus state, and the image sensor is controlled to collect light passing through the optical rotation device and the lens device to obtain multiple images; wherein a difference between an optical rotation angle of the second optical rotation state and an optical rotation angle of the first optical rotation state is equal to 90 degrees.

In S2, polarized image information is obtained according to the multiple images.

In an exemplary embodiment, the optical rotation device includes a twist nematic liquid crystal cell. When the twist nematic liquid crystal cell is controlled to be in the first optical rotation state, a polarization direction of light passing through the twist nematic liquid crystal cell is not rotated. When the twist nematic liquid crystal cell is controlled to be in the second optical rotation state, a polarization direction of light passing through the twisted nematic liquid crystal cell is rotated by 90 degrees.

In an exemplary embodiment, the lens device includes a liquid crystal lens, or includes a liquid crystal lens and a glass lens. Light passing through the liquid crystal lens is not modulated when the liquid crystal lens is controlled to be in the out-of-focus state, and a polarization component, in a set direction, of the light passing through the liquid crystal lens is modulated when the liquid crystal lens is controlled to be in the in-focus state.

In an exemplary embodiment, the act S1 includes: the optical rotation device is controlled to be in the first optical rotation state, the liquid crystal lens is controlled to be in the out-of-focus state, and the image sensor is controlled to obtain an original image; the optical rotation device is controlled to be in the first optical rotation state, the liquid crystal lens is controlled to be in the in-focus state, and the image sensor is controlled to obtain a first image; and the optical rotation device is controlled to be in the second optical rotation state, the liquid crystal lens is controlled to be in the in-focus state, and the image sensor is controlled to obtain a second image.

In another exemplary embodiment, the act S1 includes: the optical rotation device is controlled to be in the second optical rotation state, the liquid crystal lens is controlled to be in the out-of-focus state, and the image sensor is controlled to obtain an original image; the optical rotation device is controlled to be in the second optical rotation state, the liquid crystal lens is controlled to be in the in-focus state, and the image sensor is controlled to obtain a second image; and the optical rotation device is controlled to be in the first optical rotation state, the liquid crystal lens is controlled to be in the in-focus state, and the image sensor is controlled to obtain a first image.

In still another exemplary embodiment, the act S1 includes: the optical rotation device is controlled to be in the first optical rotation state, the liquid crystal lens is controlled to be in the in-focus state, and the image sensor is controlled to obtain a first image; the optical rotation device is controlled to be in the second optical rotation state, the liquid crystal lens is controlled to be in the in-focus state, and the image sensor is controlled to obtain a second image; and the optical rotation device is controlled to be in the second optical rotation state, the liquid crystal lens is controlled to be in the out-of-focus state, and the image sensor is controlled to obtain an original image.

In still another exemplary embodiment, the act S1 includes: the optical rotation device is controlled to be in the second optical rotation state, the liquid crystal lens is controlled to be in the in-focus state, and the image sensor is controlled to obtain a second image; the optical rotation device is controlled to be in the first optical rotation state, the liquid crystal lens is controlled to be in the in-focus state, and the image sensor is controlled to obtain a first image;

and the optical rotation device is controlled to be in the first optical rotation state, the liquid crystal lens is controlled to be in the out-of-focus state, and the image sensor is controlled to obtain an original image.

Herein, the act S2 includes any one or more of the following acts: subtracting the original image from the first image to obtain a polarized image in a first direction; subtracting the original image from the second image to obtain a polarized image in a second direction; adding a result of subtracting the original image from the first image and a result of subtracting the original image from the second image to obtain a complete polarized image (or called a polarized image of the target object); subtracting the result of subtracting the original image from the second image from the result of subtracting the original image from the first image, that is, subtracting the second image from the first image to obtain a difference between the polarized image in the first direction and the polarized image in the second direction; wherein, the first direction is perpendicular to the second direction.

In an exemplary embodiment of the present disclosure, a controller is also provided. The controller may include a processor, a memory, and a computer program stored on the memory and capable of running on the processor. When the processor executes the computer program, the processor implements operations performed by the controller in this disclosure.

Figure 5:
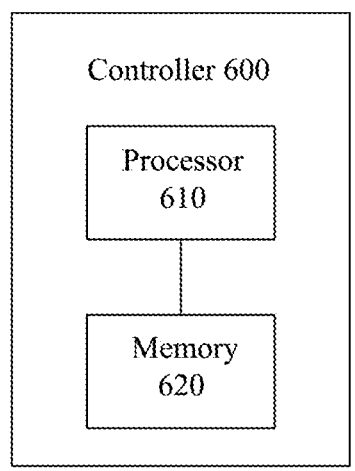
FIG. 5 is a schematic diagram of a structure of a controller according to an embodiment of the present disclosure.

As shown in FIG. 5, in one example, a controller 600 may include a processor 610 and a memory 620; wherein, the memory 620 is configured to store instructions, and the processor 610 is configured to execute the instructions stored in the memory 620.

It should be understood that processor 610 may be a Central Processing Unit (CPU), or the processor 610 may be another general-purpose processor, a digital signal processor (DSP), an application specific integrated circuit (ASIC), a field programmable gate array (FPGA) or other programmable logic devices, a discrete gate or transistor logic device, a discrete hardware component, etc. The general-purpose processor may be a microprocessor or the processor may be any conventional processor.

The memory 620 may include a read only memory and/or a random access memory, and provides instructions and data to the processor 610. A portion of the memory 620 may also include a non-volatile random access memory.

In an implementation process, the processing performed by the processing device may be completed by an integrated logic circuit of hardware in the processor 610 or instructions in the form of software. That is, the acts of the method in the embodiments of the present disclosure may be embodied as the execution of hardware processor, or the execution of a combination of hardware in the processor and software modules. The software modules may be located in a storage medium, such as a random access memory, a flash memory, a read-only memory, a programmable read-only memory, an electrically erasable programmable memory, or register. The storage medium is located in memory 620, and the processor 610 reads the information in the memory 620 and completes the acts of the above method in combination with its hardware. To avoid repetition, the detail will not be described here. The controller may be the controller in FIG. 1 or the control circuit in FIG. 2 or 3.

In an exemplary embodiment, a computer readable storage medium is also provided, which stores executable instructions. When executed by a processor, the executable instructions can realize the polarization imaging method provided by any of the above embodiments of the present disclosure. The polarization imaging method can be used to control the polarization imaging apparatus provided by the above embodiments of the present disclosure to perform polarization imaging, thereby improving the processing efficiency, speed and accuracy of the polarization imaging. A method of driving the polarization imaging apparatus to perform polarization imaging by executing the executable instructions is the same as the polarization imaging method provided in the above embodiments of the present disclosure, and will not be described repeatedly here.

In the description of embodiments of the present disclosure, it needs to be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing embodiments of the present disclosure and simplifying the description, rather than indicating or implying that the apparatus or element referred to must have the specific orientation, or be constructed and operated in the specific orientation, and thus cannot be interpreted as a limitation on the present disclosure.

In the description of embodiments of the present disclosure, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. Those of ordinary skill in the art can understand the meanings of the above mentioned terms in the present disclosure according to situations.

Those of ordinary skill in the art will understand that all or some of the acts, systems, and functional modules/units in the methods disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer readable media, which may include computer storage media (or non-transitory media) and communication media (or transitory media). As is well known to those of ordinary skill in the art, the term "computer storage media" includes volatile and non-volatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other media that can be used to store desired information and can be accessed by a computer. Furthermore, it is well known to those of ordinary skill in the art that communication media typically contain computer readable instructions, data structures, program modules, or other data in a modulated data signal such as a carrier or other transmission mechanism, and may include any information delivery medium. Although implementations disclosed in the present disclosure are as the above, the described contents are only implementations used for facilitating understanding the present disclosure, and are not used to limit the present disclosure. Any person skilled in the art to which the present invention pertains can make any modifications and variations in the forms and details of the implementations without departing from the spirit and the scope disclosed in the present disclosure, but the patent protection scope of the present invention shall still be subject to the scope defined by the appended claims.

What we claim is:

1. A polarization imaging apparatus, comprising an optical rotation device, a lens device, an image sensor, an image processor, and a controller which are sequentially arranged along a ray direction of incident light, wherein, the controller is connected with the optical rotation device, the lens device, and the image sensor respectively, and is configured to control the optical rotation device to be in a first optical rotation state or a second optical rotation state, control the lens device to be in an in-focus state or an out-of-focus state, and control the image sensor to collect light passing through the optical rotation device and the lens device to obtain a plurality of images; wherein a difference between an optical rotation angle of the second optical rotation state and an optical rotation angle of the first optical rotation state is equal to 90 degrees;

the image processor is connected with the image sensor and is configured to obtain polarized image information according to the plurality of images, wherein the plurality of images comprise:

an original image obtained by the image sensor when the optical rotation device is in the second optical rotation state and the lens device is in the out-of-focus state;

a second image obtained by the image sensor when the optical rotation device is in the second optical rotation state and the lens device is in the in-focus state; and a first image obtained by the image sensor when the optical rotation device is in the first optical rotation state and the lens device is in the in-focus state.

2. The polarization imaging apparatus according to claim 1, wherein, the optical rotation device comprises a twist nematic liquid crystal cell; when the twist nematic liquid crystal cell is in the first optical rotation state, a polarization direction of light passing through the twist nematic liquid crystal cell is not rotated, and when the twist nematic liquid crystal cell is in the second optical rotation state, a polarization direction of light passing through the twist nematic liquid crystal cell is rotated by 90 degrees.

3. The polarization imaging apparatus according to claim 1, wherein, the lens device comprises a liquid crystal lens, or comprises a liquid crystal lens and a glass lens; when the liquid crystal lens is in the out-of-focus state, light passing through the liquid crystal lens is not modulated, and when the liquid crystal lens is in the in-focus state, a polarization component, in a set direction, of light passing through the liquid crystal lens is modulated.

4. The polarization imaging apparatus according to claim 2, wherein, the controller comprises a twist nematic liquid crystal driving circuit, a first control circuit, and a third control circuit, wherein:

the twist nematic liquid crystal driving circuit is connected with the twist nematic liquid crystal cell and the first control circuit respectively, and is configured to control the twist nematic liquid crystal cell to be in the first or second optical rotation state according to a control instruction sent by the first control circuit;

the first control circuit is connected with the twist nematic liquid crystal driving circuit, and is configured to control the twist nematic liquid crystal driving circuit by sending a control signal; and the third control circuit is connected with the image sensor, and is configured to control the image sensor by sending a control signal.

5. The polarization imaging apparatus according to claim 3, wherein, the controller comprises a liquid crystal lens driving circuit, a second control circuit, and a third control circuit, wherein:

the liquid crystal lens driving circuit is connected with the liquid crystal lens and the second control circuit respectively, and is configured to control the liquid crystal lens to be in the in-focus state or the out-of-focus state according to a control instruction sent by the second control circuit;

the second control circuit is connected with the liquid crystal lens driving circuit, and is configured to control the liquid crystal lens driving circuit by sending a control signal; and the third control circuit is connected with the image sensor, and is configured to control the image sensor by sending a control signal.

6. The polarization imaging apparatus according to claim 1, wherein, the polarized image information comprises one or more of the following information: a polarized image in a first direction, a polarized image in a second direction, a complete polarized image, and a difference between the polarized image in the first direction and the polarized image in the second direction, wherein the first direction is perpendicular to the second direction; wherein, the polarized image in the first direction=a first image−an original image;

the polarized image in the second direction=a second image−the original image;

the complete polarized image=a result of subtracting the original image from the first image+a result of subtracting the original image from the second image;

the difference between the polarized image in the first direction and the polarized image in the second direction=the first image−the second image.

7. A polarization imaging method, wherein an optical rotation device, a lens device and an image sensor are sequentially arranged along a ray direction of incident light, and the method comprises:

controlling the optical rotation device to be in a first optical rotation state or a second optical rotation state, controlling the lens device to be in an in-focus state or an out-of-focus state, and controlling the image sensor to collect light passing through the optical rotation device and the lens device to obtain a plurality of images; wherein a difference between an optical rotation angle of the second optical rotation state and an optical rotation angle of the first optical rotation state is equal to 90 degrees; and obtaining polarized image information according to the plurality of images, wherein the plurality of images comprise:

an original image obtained by the image sensor when the optical rotation device is in the second optical rotation state and the lens device is in the out-of-focus state;

a second image obtained by the image sensor when the optical rotation device is in the second optical rotation state and the lens device is in the in-focus state; and a first image obtained by the image sensor when the optical rotation device is in the first optical rotation state and the lens device is in the in-focus state.

8. The polarization imaging method according to claim 7, wherein, the optical rotation device comprises a twist nematic liquid crystal cell; when the twist nematic liquid crystal cell is controlled to be in the first optical rotation state, a polarization direction of light passing through the twist nematic liquid crystal cell is not rotated, and when the twist nematic liquid crystal cell is controlled to be in the second optical rotation state, a polarization direction of light passing through the twist nematic liquid crystal cell is rotated by 90 degrees.

9. The polarization imaging method according to claim 7, wherein, the lens device comprises a liquid crystal lens, or comprises a liquid crystal lens and a glass lens; when the liquid crystal lens is controlled to be in the out-of-focus state, light passing through the liquid crystal lens is not modulated, and when the liquid crystal lens is controlled to be in the in-focus state, a polarization component, in a set direction, of light passing through the liquid crystal lens is modulated.

10. The polarization imaging method according to claim 7, wherein, controlling the optical rotation device to be in the first optical rotation state or the second optical rotation state, controlling the lens device to be in the in-focus state or the out-of-focus state; and controlling the image sensor to collect light passing through the optical rotation device and the lens device to obtain the plurality of images comprises:

controlling the optical rotation device to be in the first optical rotation state, controlling the lens device to be in the out-of-focus state, and controlling the image sensor to obtain an original image;

controlling the optical rotation device to be in the first optical rotation state, controlling the lens device to be in the in-focus state, and controlling the image sensor to obtain a first image; and controlling the optical rotation device to be in the second optical rotation state, controlling the lens device to be in the in-focus state, and controlling the image sensor to obtain a second image.

11. The polarization imaging method according to claim 7, wherein, controlling the optical rotation device to be in the first optical rotation state or the second optical rotation state, controlling the lens device to be in the in-focus state or the out-of-focus state, and controlling the image sensor to collect light passing through the optical rotation device and the lens device to obtain the plurality of images comprises:

controlling the optical rotation device to be in the second optical rotation state, controlling the lens device to be in the out-of-focus state, and controlling the image sensor to obtain an original image;

controlling the optical rotation device to be in the second optical rotation state, controlling the lens device to be in the in-focus state, and controlling the image sensor to obtain a second image; and, controlling the optical rotation device to be in the first optical rotation state, controlling the lens device to be in the in-focus state, and controlling the image sensor to obtain a first image.

12. The polarization imaging method according to claim 7, wherein, controlling the optical rotation device to be in the first optical rotation state or the second optical rotation state; controlling the lens device to be in the in-focus state or the out-of-focus state; and controlling the image sensor to collect light passing through the optical rotation device and the lens device to obtain the plurality of images comprises:

controlling the optical rotation device to be in the first optical rotation state, controlling the lens device to be in the in-focus state, and controlling the image sensor to obtain a first image;

controlling the optical rotation device to be in the second optical rotation state, controlling the lens device to be in the in-focus state, and controlling the image sensor to obtain a second image; and controlling the optical rotation device to be in the second optical rotation state, controlling the lens device to be in an out-of-focus state, and controlling the image sensor to obtain an original image.

13. The polarization imaging method according to claim 7, wherein, controlling the optical rotation device to be in the first optical rotation state or the second optical rotation state; controlling the lens device to be in the in-focus state or the out-of-focus state; and controlling the image sensor to collect light passing through the optical rotation device and the lens device to obtain the plurality of images comprises:

controlling the optical rotation device to be in the second optical rotation state, controlling the lens device to be in the in-focus state, and controlling the image sensor to obtain a second image;

controlling the optical rotation device to be in the first optical rotation state, controlling the lens device to be in the in-focus state, and controlling the image sensor to obtain a first image; and controlling the optical rotation device to be in the first optical rotation state, controlling the lens device to be in the out-of-focus state, and controlling the image sensor to obtain an original image.

14. The polarization imaging method according to claim 10, wherein, obtaining polarization image information according to the plurality of images comprises one or more of the following:

subtracting the original image from the first image to obtain a polarized image in a first direction;

subtracting the original image from the second image to obtain a polarized image in a second direction;

adding a result of subtracting the original image from the first image and a result of subtracting the original image from the second image to obtain a complete polarized image;

subtracting the second image from the first image to obtain a difference between the polarized image in the first direction and the polarized image in the second direction;

wherein, the first direction is perpendicular to the second direction.

15. A controller comprising: a memory, a processor and a computer program stored on the memory and capable of running on the processor, wherein, when executing the program, the processor implements acts of the method according to claim 7.

16. A computer readable storage medium storing computer executable instructions, wherein the computer executable instructions are used for performing the method according to claim 7.

* * * * *